United States Patent [19]

Detrick

[11] Patent Number: 4,711,632
[45] Date of Patent: Dec. 8, 1987

[54] COMPATIBILITY/INCOMPATIBILITY FORECASTING DEVICE

[76] Inventor: Jeffrey C. Detrick, P.O. Box 3155, Shawnee Mission, Kans. 66203

[21] Appl. No.: 891,779
[22] Filed: Jul. 30, 1986
[51] Int. Cl.⁴ ............................................. G09B 19/00
[52] U.S. Cl. .................................................... 434/106
[58] Field of Search ............... 434/106, 174, 198, 402, 434/404; 273/141 R, 142 R, 142 H, 142 HA, 161

[56] References Cited

U.S. PATENT DOCUMENTS

| 1,692,105 | 11/1928 | Abromeit | 434/106 |
| 1,719,723 | 7/1929 | Phillips | 434/290 |
| 1,918,472 | 7/1933 | Hetherington | 273/141 R |
| 3,355,822 | 12/1967 | Losey | 434/106 |
| 3,460,273 | 8/1969 | Boyd | 434/174 |
| 3,652,092 | 3/1972 | Boyer et al. | 273/243 |
| 4,306,141 | 12/1981 | Bailey et al. | 235/78 R |
| 4,379,698 | 4/1983 | Boyd | 434/106 |
| 4,472,144 | 9/1984 | Mantley | 434/106 |

FOREIGN PATENT DOCUMENTS

| 3029732 | 3/1982 | Fed. Rep. of Germany | 434/106 |
| 2308998 | 12/1976 | France | 434/106 |

Primary Examiner—John E. Murtagh
Assistant Examiner—Andrew Joseph Rudy
Attorney, Agent, or Firm—Schmidt, Johnson, Hovey & Williams

[57] ABSTRACT

A simple, easy-to-use astrological/educational tool is provided which allows a user to readily obtain information regarding those individuals or groups who are compatible or incompatible with the user, in accordance with astrological principles. In preferred forms, the tool of the invention includes a central circular section bearing circularly arrayed astrological sign indicia on both faces thereof, together with a compatibility wheel and an incompatibility wheel respectively rotationally coupled to the central section and oriented adjacent the separate faces of the latter. The compatibility wheel includes three equidistantly and circumferentially spaced indicators, whereas the incompatibility wheel includes four such indicators. In particularly preferred forms of the invention, the device includes a pair of planet wheels bearing circularly arrayed planet information, with a planet wheel being interposed between the compatibility and incompatibility wheel and the adjacent faces of the central section. The user can readily ascertain the signs of both compatible and incompatible individuals or groups by simple manipulation of the wheels.

9 Claims, 7 Drawing Figures

U.S. Patent  Dec. 8, 1987  Sheet 1 of 2  4,711,632
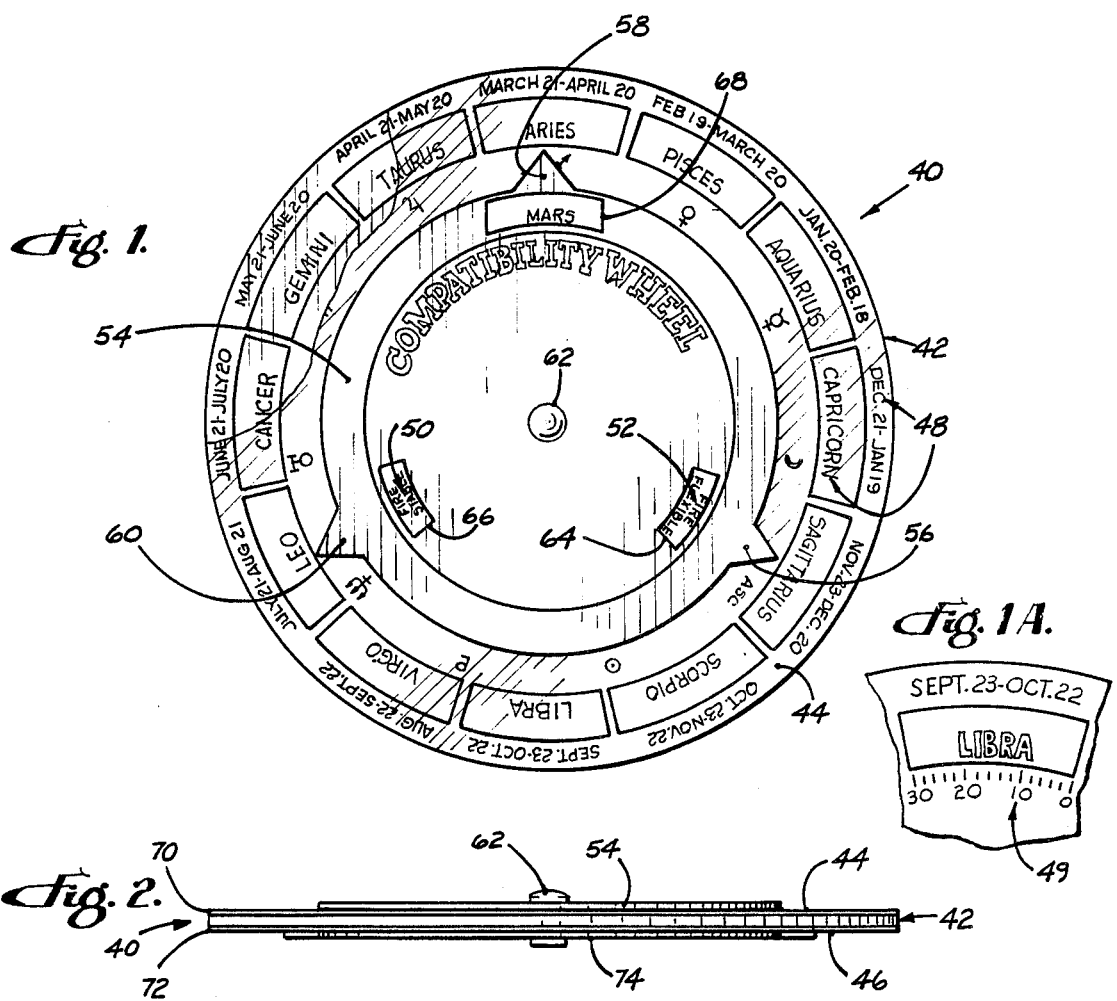
fig. 1.
fig. 1A.
fig. 2.
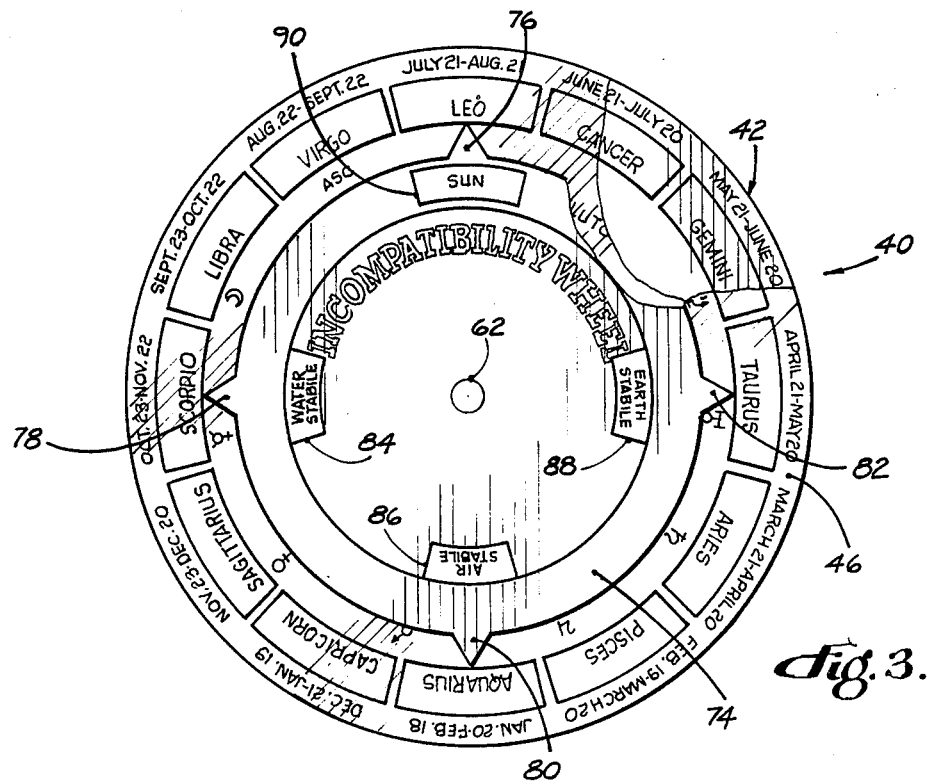
fig. 3.

COMPATIBILITY/INCOMPATIBILITY FORECASTING DEVICE

BACKGROUND OF THE INVENTION

1. Field of the Invention

The present invention is concerned with a simplified wheel-type astrological/educational forecasting tool which can be used by both professional astrologers and lay persons to provide information regarding the compatibility and incompatibility with others based upon astrological data. More particularly, it is concerned with such a compatibility tool which provides ready information regarding both the compatibility and incompatibility of persons to one another, all without the complex undertaking involved in traditional astrological chart interpretation.

2. Description of the Prior Art

Astrology has a long and colorful history, dating far back into antiquity. As a consequence, considerable literature has been generated through the ages regarding the effect of the planets and other heavenly bodies on people or events.

Notwithstanding this vast storehouse of accumulated knowledge, the gathering and proper interpretation of astrological information has largely remained within the province of the professional. This is so despite the strong personal desires of many individuals for horoscope information. a U.S. Pat. No. 4,306,141 to Bailey et al. describes a mechanical astrological calculating device designed to aid the user in the ascertaining of the relative positions of heavenly bodies at different times and places. However, this device is again rather complicated and appears to be difficult to use, particularly by the uninitiated layman.

SUMMARY OF THE INVENTION

The present invention provides a greatly improved and simplified astrological/educational tool which is particularly designed for providing information regarding the compatibility and incompatibility of people based upon astrological data. The preferred tool of the invention includes a flat central section presenting a pair of opposed faces, each face bearing indicia representing the twelve astrological signs. Such indicia is oriented in a circular array about the periphery of the faces of the central section. The tool further includes a first compatibility wheel rotatably mounted to the central section and adjacent one of the faces thereof. The first wheel includes three indicators equidistantly and circumferentially spaced about the periphery thereof, so as to be oriented for simultaneous alignment with four individual three-membered sets of the astrological sign indicia upon rotation of the first wheel.

A second incompatibility wheel is also provided with the preferred tool, although in simplified forms of the invention only one wheel need be employed. The incompatibility wheel is rotatably mounted to the central section and adjacent the other of the sign indicia-bearing faces. The second wheel includes four indicators equidistantly and circumferentially spaced about the periphery of the second wheel and oriented for simultaneous alignment with three four-membered sets of the sign indicia upon rotation of the second wheel.

In use of the preferred device, a person born under the Cancer sun sign, for example, would rotate the compatibility wheel so that one of the indicators is aligned with the Cancer indicium; such a person would therefore learn that those born under the sun sign of Pisces and Scorpio are compatible. In like fashion, such a person using the incompatibility wheel portion of the tool would rotate one of the four indicators to the Cancer indicium, thereby learning that those born under the sun signs of Aries, Capricorn and Libra are incompatible.

In other forms of the invention, planet wheels are interposed between the respective central section faces and the first and second indicator wheels. Such planet wheels each include circularly arrayed planet indicia designed to align with the astrological sign information on the central section. For this purpose, it is preferred that the planet wheels be made of transparent synthetic resin material and bear the planet information as imprinting thereon.

Using the planet wheel and astrological data regarding the position of the various planets relative to the astrological signs derived from a source such as a computer printout, for example (such astrological programs being commercially available), one can readily gather pertinent astrological compatibility/incompatibility information. Such printout data would normally include the degrees of arc, ranging from 0-30 degrees, astrologically derived from the user's date, time and place of birth for each of the planets, the sun, the moon and ascendency relative to the astrological constellations.

BRIEF DESCRIPTION OF THE DRAWINGS

FIG. 1 is a plan view of the compatibility wheel side of the preferred astrological/educational tool in accordance with the invention;

FIG. 1A is a fragmentary view showing a modified form of the tool of FIG. 1;

FIG. 2 is a side elevational view of the tool shown in FIG. 1;

FIG. 3 is a plan view of the incompatibility wheel side of the tool illustrated in FIG. 1;

DESCRIPTION OF THE PREFERRED EMBODIMENTS

Figure 4:
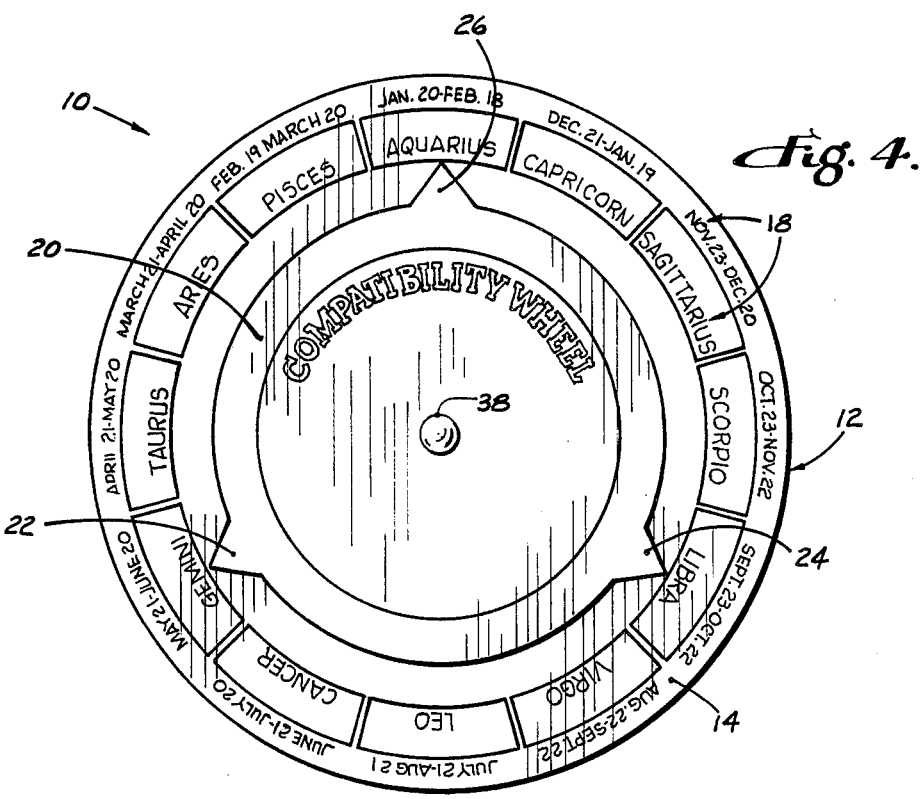
FIG. 4 is a plan view of a simplified tool in accordance with the invention, viewing the compatibility wheel face of the tool.
Figure 5:
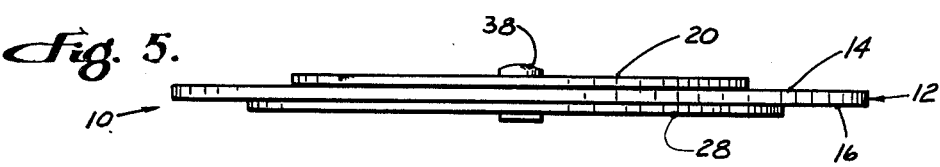
FIG. 5 is a side elevational view of the tool depicted in FIG. 4.
Figure 6:
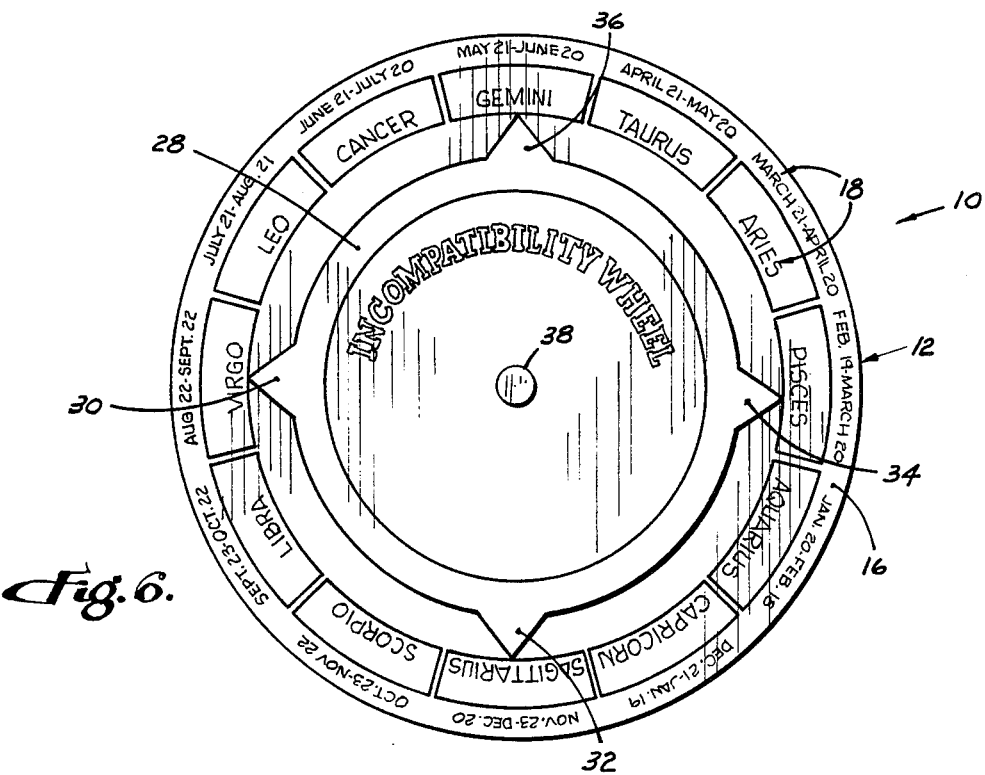
FIG. 6 is a plan view depicting the incompatibility wheel face of the tool of FIG. 4.

Turning first to a simplified version of the present invention illustrated in FIGS. 4-6, a wheel-type astrological/educational tool 10 is illustrated. Tool 10 includes a central, circular, relatively large diameter central section 12 presenting a pair of opposed faces 14, 16. Each of the faces 14, 16 is imprinted with indicia representing the twelve astrological signs. Such indicia 18 includes, for each sign, the name of the sign (e.g., Sagittarius) together with the calendar dates of that sign, i.e., November 23-December 20 for the sign of Sagittarius.

The tool 10 further includes a first compatibility wheel 20 which is rotatably mounted to the section 12 and is situated adjacent face 14 of the latter. The wheel 20 is provided with three indicator arrows 22, 24 and 26 about the periphery thereof. The arrows are equidistantly and circumferentially spaced about the wheel and are thereby oriented for simultaneous alignment with four three-membered sets of the sign indicia imprinted on central section 12, upon rotation of the first wheel 20. For example, if one were born under the sun sign of Aquarius, it would only be necessary to rotate wheel 20 so that one of the indicator arrows was pointing to the indicia representing the sun sign of Aquarius, whereupon the remaining two indicator arrows 22, 24, would respectively point to the indicia representing the sun signs of Gemini and Libra. This would inform the user that persons born under the sun signs of Gemini and Libra were compatible with the user.

The overall tool 10 further includes a second incompatibility wheel 28 mounted to central section 12 and adjacent the opposed face 16 thereof. The second wheel includes four indicator elements or arrows 30–36 which are equidistantly and circumferentially spaced about the periphery of the second wheel 28.

In use of the incompatibility wheel, a user born under the sun sign of Gemini, for example, would rotate the wheel 28 until one of the indicator arrows was aligned with the indicia representing Gemini; the remaining three arrows would then indicate to the user that those born under the sun signs of Virgo, Sagittarius and Pisces were incompatible with the user within the context of the sun sign positions.

As best seen in FIG. 5, the respective wheels 20, 28 are coaxially mounted for rotation by means of a grommet 38 or similar expedient. In the case of the tool 10, the central section is fabricated from thin paperboard material or plastic or plastic coated paperboard, whereas the first and second wheels 20, 28 are likewise formed of these materials. The various indicia on these elements is simply imprinted onto the central section and wheels, as those skilled in the art will readily appreciate.

FIGS. 1–3 depict a somewhat more advanced form of the invention in the form of a tool 40. The device 40 likewise includes a central section 42 which is circular in configuration and is advantageously formed of a pasteboard-type material. The central section includes a pair of opposed faces 44, 46. Each of these faces is imprinted with indicia representing the twelve astrological signs, this information being displayed in a circular array about the periphery of each face 44, 46. In particular, it will be seen that the sign indicia 48 on each face includes a word identification of each sign and the dates of each respective sign. In other forms of the invention, the faces 44, 46 are imprinted with twelve sets of degree marks and numbers, one for each sign; the marks and number sets are arrayed in a counterclockwise fashion with the numbers being from 0–30 degrees, as shown at 49 in FIG. 1A.

In an alternative embodiment of FIG. 1 where the degree marks and number sets are omitted, each face 44, 46 of the central section 42 may be provided with additional imprinted indicia giving information summaries regarding the astrological elements and qualities of each sign. That is to say, in astrology there are four elements, namely water, air, fire and earth, and a particular sign may be cardinal, mutable, and fixed with respect to each element; for ease of use and understanding by laymen however, the terms initiating, flexible and stable have been adopted. Accordingly, this quality information may be provided in a circular array on each face 44, 46 with the correct summary information being in alignment with the appropriate sign indicia. For example, in viewing FIG. 1 for example, it is noted that Leo is "fire stable", as at 50, whereas Sagittarius is "fire flexible", as at 52. In order to provide a complete disclosure of the preferred information used in this embodiment, the following table sets forth the imprinted information regarding each sign:

| SIGNS | ELEMENTS (QUALITIES) |
|---|---|
| Capricorn | Earth initiating (cardinal) |
| Sagittarius | Fire flexible (mutable) |
| Scorpio | Water stable (fixed) |
| Libra | Air initiating (cardinal) |
| Virgo | Earth flexible (mutable) |
| Leo | Fire stable (fixed) |
| Cancer | Water initiating (cardinal) |
| Gemini | Air flexible (mutable) |
| Taurus | Earth stable (fixed) |
| Aries | Fire initiating (cardinal) |
| Pisces | Water flexible (mutable) |
| Aquarius | Air stable (fixed) |

The tool 40 includes a compatibility wheel 54 which is similar to the wheel 20 and includes three equidistantly and circumferentially spaced indicator arrows 56–60 about the periphery thereof. The wheel 54 is situated adjacent face 44 of central section 42, and is rotatably mounted thereto by means of grommet 62.

In those embodiments making use of the aforementioned information summaries, the wheel 54 is provided with a pair of openings 64, 66 therethrough which are aligned with two of the arrows 56, 60 as illustrated. Moreover, the openings 64, 66 are oriented for reading of respective quality information provided on the face 44 of central section 42 as explained above. Hence, as the wheel 54 is rotated, the quality and element information comes into view when the arrows associated therewith are properly aligned with astrological sign indicia.

Finally, it will be seen that the wheel 54 in such embodiments is provided with an aperture 68 therethrough which is spaced radially outward of the openings 64, 66, and is aligned with the remaining indicator arrow 58. The purpose of the aperture 68 will be made clear hereinafter.

The device 40 further has a pair of planet wheels 70, 72 which are respectively located adjacent and in engagement with a face 44, 46 of the central section 42. The planet wheels 70, 72 are formed of transparent, flexible synthetic resin material, and are circular in shape and essentially coincident with the central section 42. The planet wheels are moreover rotatable about the axis defined by grommet 62. Each planet wheel is imprinted with indicia regarding the planets, the sun, the moon and ascendancy. This information is displayed in a circular array on each planet wheel, in general alignment with the sign indicia on the adjacent faces 44, 46 of central section 42. With respect to wheel 54, it will be observed that the planet information is oriented for viewing through aperture 68 as the planet wheel 70 and compatibility wheel 54 are appropriately rotated.

The overall tool 40 in the illustrated embodiment also has a second incompatibility wheel 74 having four circumferentially and equidistantly spaced indicator arrows 76–82 about the periphery thereof. The wheel 74 further is provided with three openings 84–88 which are respectively in alignment with a corresponding indicator arrow 78, 80 or 82. These openings 84–88 are located for revealing the quality and element information previously described imprinted upon the face 46 of central section 42.

Finally, the incompatibility wheel 74 includes an aperture 90 similar to aperture 68 previously described. The aperture 90 is located in alignment with the remaining indicator arrow 76, to identify the planets which are listed in a circular array on the planet wheel 72.

In the embodiments of the invention employing the degree marks and numbers in lieu of the information summaries (FIG. 1A) the wheels 54 and 74 do not have the openings 64, 66, 68, 84-88 and 90 therethrough.

Use of device 40 is in some respects similar to that of device 10. That is to say, the user initially may ascertain the signs of compatible and incompatible individuals simply through the use of the wheels 54, 74, without reference to the underlying planet wheels 70, 72. Using the planet wheels, the user can gather astrological compatibility/incompatibility information by aligning the pointer to the pertinent astrological sign for a certain heavenly body. For example, where for a given individual Mercury is in Aquarius, the planet wheel 70 may be rotated until the Mercury indicia is in alignment with the Aquarius indicia on the adjacent face of the central section 42. Thereupon, the compatibility wheel 54 is rotated until the aperture 68 comes into alignment with the word "Mercury." At this point, the user will be advised that those having Mercury in Gemini and Mercury in Libra are compatible. By the same token, use can be made of incompatibility wheel 74 in the same manner. Thus, for an individual having Mercury in Aquarius, the result would be advisement that those individuals having Mercury in Taurus, Leo or Scorpio would not be compatible in the context of the Mercury position. The incompatibility wheel 74 in conjunction with planet wheel 72 can be used in a similar fashion to obtain more detailed information regarding incompatible individuals.

An even more refined forecast my be obtained using a tool having the degree and numbers sets 49 associated with each sign, as depicted in FIG. 1A. Thus, from printout or other data, the user will align the pointer with the specific degree of arc of each of the planets, the sun, the moon and ascendancy relative to the signs. This will then develop compatibility/incompatibility data which can be supplemented using established texts on astrology. For example, a given printout for an individual, based upon the individual's birth information, may be as follows:

| Sun | is 25.36 | Degrees in Aquarius |
| Ascendant | is 11.24 | Degrees in Sagittarius |
| Moon | is 23.29 | Degrees in Aries |
| Mercury | is 4.59 | Degrees in Pisces |
| Venus | is 4.18 | Degrees in Aries |
| Mars | is 28.49 | Degrees in Leo |
| Jupiter | is 23.52 | Degrees in Sagittarius |
| Saturn | is 18.39 | Degrees in Leo |
| Uranus | is 22.01 | Degrees in Gemini |
| Neptune | is 12.43 | Degrees in Libra |
| Pluto | is 13.27 | Degrees in Leo |

In this embodiment, the FIG. 1A tool is basically used to plot the overall compatibility or incompatibility by employing the user's complete planetary aspect. It is to be used in conjunction with the computer printout which will vary in signs, degrees and planets according to an individual's month, day, year, and time of birth (A.M. or P.M.) plus place of birth. This in effect will give the layman the opportunity to predict the compatibility/incompatibility between any two people or in relationship with himself or any other person with surprising accuracy, as long as he has the requisite birth information and the computer printout.

The manner of using the FIG. 1 device is very simple. The first operation is to ascertain the sun position on the printout. In the example given, the printout states that the sun is 25 degrees in Aquarius. The planet wheel 70 is then rotated to place the "sun" indicia under the sign of Aquarius, whereupon one of the indicators 56-60 is adjusted to 25 degrees on the associated mark and number set 49. The remaining indicators located 120 degrees both counter-clockwise and clockwise now point to 25 degrees Gemini and 25 degrees Libra. This means that for the sun sign 25 degrees of Libra, the most compatible sun signs are 25 degrees Aquarius and 25 degrees Gemini.

The user repeats the foregoing steps for each of the sun signs and planet wheel indicia, following the printout information. This gives a very refined compatibility/incompatibility forecast.

I claim:

1. An educational/forecasting astrological device making use of the twelve astrological signs, said device consisting essentially of:

a flat central section having a pair of opposed faces;

first and second flat members rotatably mounted to said central section and respectively in proximal, face-to-face relationship with one of the faces of said central section, said central section, and said first and second members, each being cooperatively configured to expose a portion of each of the faces of said central section, said central section and first and second members rotatably mounted thereto cooperatively presenting first and second opposed side surfaces, each of said side surfaces being defined by a outer face of the corresponding member remote from said central section, and an exposed portion of an adjacent face of said central section;

indicia means on said first side surface including, on one of said first member outer face and said exposed portion of the adjacent face of the central section, three spaced apart compatibility indicator means located in fixed relationship to each other, and, on the other of said first member outer face and the exposed portion of the adjacent face of the central section, astrological indicia representing the twelve astrological signs, said three indicator means being oriented with respect to said first side surface astrological indicia for alignment of the three indicator means with four respective three-membered sets of said first side surface astrological indicia upon relative rotation between said central section and first member;

indicia means on said second side surface including, on one of said second member outer face and said exposed portion of the adjacent face of the central section, four spaced apart incompatability indicator means located in fixed relationship to each other, and, on the other of said second member outer face and exposed portion of the adjacent face of the central section, astrological indicia representing the twelve astrological signs, said four indicator means being oriented with respect to said second side surface astrological indicia for alignment of the four indicator means with three respective four-membered sets of said second side surface astrological indicia upon relative rotation between said central section and second member.

2. The tool of claim 1, said first and second members being oriented for coaxial rotation.

3. The tool of claim 1, said central section being circular and of greater diameter than said first and second members.

4. The tool of claim 1, said central section further including, on each face thereof and in alignment with each respective sign indicium, imprinted information summaries regarding the astrological qualities and elements of each sign.

5. The tool of claim 4, including a pair of first openings through said first member and respectively in alignment with two of said first member indicators, said first member openings being oriented for permitting simultaneous reading of respective pairs of said information summaries on said one face.

6. The tool of claim 5, including a first planet member rotatably mounted to said central section and interposed between said one face and said first member, said first planet member having indicia thereon representing the sun, the planets, the moon, and ascendancy, said first planet member indicia being located in an array for alignment with the sign indicia of said one face of said central section upon rotation of the first planet member relative to said central section, said first member having an aperture therethrough in alignment with the remaining first member indicator, said first member aperture being located for reading of individual indicia on said first planet member upon apropriate rotation of the first member and first planet member.

7. The tool of claim 4, including three openings through said second member and respectively in alignment with three of said second member indicators, said second members openings being oriented for permitting simultaneous reading of respective three-membered sets of said information summaries on said other face.

8. The tool of claim 7, including a second planet member rotatably mounted to said central section and interposed between said other face and said second member, said second planet member having indicia thereon representing the sun, the planets, the moon, and ascendancy, said second planet member indicia being located in an array for alignment with the sign indicia of said other face of said central section, said second member having an aperture therethrough in alignment with the remaining second member aperture being located for reading of individual indicium on said second planet member upon appropriate rotation of the second member and second planet member.

9. The device of claim 1, said compatibility indicator means being located on said first member outer face, and said incompatibility indicator means being located on said second member outer face.

* * * * *